United States Patent
Chou

(10) Patent No.: US 9,109,605 B2
(45) Date of Patent: Aug. 18, 2015

(54) FAN IMPELLER STRUCTURE AND MANUFACTURING METHOD THEREOF

(75) Inventor: Chu-Hsien Chou, New Taipei (TW)

(73) Assignee: ASIA VITAL COMPONENTS CO., LTD., New Taipei (TW)

(*) Notice: Subject to any disclaimer, the term of this patent is extended or adjusted under 35 U.S.C. 154(b) by 619 days.

(21) Appl. No.: 13/454,629

(22) Filed: Apr. 24, 2012

(65) Prior Publication Data

US 2013/0280086 A1    Oct. 24, 2013

(51) Int. Cl.
*F04D 29/30* (2006.01)
*F04D 29/02* (2006.01)
*F04D 29/28* (2006.01)
*F04D 29/62* (2006.01)
*B29L 31/08* (2006.01)

(52) U.S. Cl.
CPC ............ *F04D 29/023* (2013.01); *F04D 29/282* (2013.01); *F04D 29/285* (2013.01); *F04D 29/30* (2013.01); *F04D 29/305* (2013.01); *F04D 29/624* (2013.01); *B29L 2031/08* (2013.01); *Y10T 29/49336* (2015.01)

(58) Field of Classification Search
CPC ..... F04D 29/282; F04D 29/285; F04D 29/30; F04D 29/305
USPC ........... 416/186 R, 213 R, 213 A, 220 R, 221
See application file for complete search history.

(56) References Cited

U.S. PATENT DOCUMENTS

| | | | |
|---|---|---|---|
| 5,558,499 A * | 9/1996 | Kobayashi | 416/186 R |
| 6,033,183 A * | 3/2000 | Genster | 416/186 R |
| 6,368,062 B1 * | 4/2002 | Yagami et al. | 416/178 |
| 8,257,043 B2 * | 9/2012 | Kuroki et al. | 416/186 R |

* cited by examiner

*Primary Examiner* — Ninh H Nguyen

(57) ABSTRACT

A fan impeller structure and a manufacturing method thereof. The fan impeller structure includes a base seat, multiple blades and a ring member. Each blade has a main body made of plastic material and at least one fixing member made of metal material. The base seat and the ring member are made of metal material. The base seat and the ring member are respectively disposed on two sides of the blades. By means of the manufacturing method, the blades can be diversified and the universality of the blades is greatly increased to lower the manufacturing cost.

8 Claims, 7 Drawing Sheets

FAN IMPELLER STRUCTURE AND MANUFACTURING METHOD THEREOF

BACKGROUND OF THE INVENTION

1. Field of the Invention

The present invention relates generally to a fan impeller structure and a manufacturing method thereof. By means of the manufacturing method, the blades of the fan impeller structure can be diversified and the universality of the blades is greatly increased to lower the manufacturing cost.

2. Description of the Related Art

A conventional blower includes a wheel-shaped housing defining an internal annular air passage. Multiple blades driven by an external power source are rotatably disposed in the housing. The blades of the blower are correspondingly positioned in the annular air passage. Under the driving force of the external power source, the blades are continuously driven and moved within the air passage to drive the air in the annular air passage from an air inlet of the housing to an air outlet. Accordingly, the air can be transferred to achieve the blowing operation.

The conventional blower is generally manufactured in two manners. One is plastic injection molding, while the other is metal connection. With respect to the plastic injection molding, the variability is higher. However, the design of the molds for the blower made by means of plastic injection molding is complicated and relatively expensive. Moreover, one set of molds can be only used to produce one kind of blades with a specific configuration. In case different blades with a different configuration are needed, it is necessary to make other molds for manufacturing the blades. This leads to increase of cost. With respect to the metal connection, several components are assembled to form the blades so that the universality is higher. However, most of the components are made by means of sheet metal processing. As a result, the shapes of the blades are quite limited and the design of the blades can be hardly diversified.

According to the above, the conventional technique has the following shortcomings:
1. The shapes of the blades are quite limited.
2. The design of the blades can be hardly diversified.
3. The cost is higher.

SUMMARY OF THE INVENTION

A primary object of the present invention is to provide a fan impeller structure in which the blades can be diversified and the universality of the blades is increased.

A further object of the present invention is to provide the above fan impeller structure, which is manufactured at lower cost.

A still further object of the present invention is to provide a manufacturing method of a fan impeller structure. By means of the manufacturing method, the blades of the fan impeller structure can be diversified and the universality of the blades is greatly increased.

A still further object of the present invention is to provide the manufacturing method of the fan impeller structure. By means of the manufacturing method, the manufacturing cost of the fan impeller structure is greatly lowered.

To achieve the above and other objects, the fan impeller structure of the present invention includes a base seat, multiple blades and a ring member. The base seat is made of metal material. A center of the base seat is formed with a hub section. The blades are disposed on one side of the base seat. Each blade has a main body made of plastic material and at least one fixing member made of metal material. The ring member is made of metal material and disposed on the other side of the blades.

The manufacturing method of the fan impeller of the present invention includes steps of: providing a base seat made of metal material and a ring member made of metal material; providing at least one fixing member made of metal material; placing the fixing member into a mold and molding multiple blades by means of plastic injection molding to fix the fixing member on the blades; and assembling the ring member and the base seat with the blades through the fixing member to form the fan impeller structure.

In the above fan impeller structure, the base seat and the ring member are made of metal material, while the blades are made of plastic material. The ring member and the base seat are assembled with the blades through the metal-made fixing member to form the fan impeller structure. Accordingly, the blades of the fan impeller structure can be diversified and the universality of the blades is increased to greatly lower the manufacturing cost.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
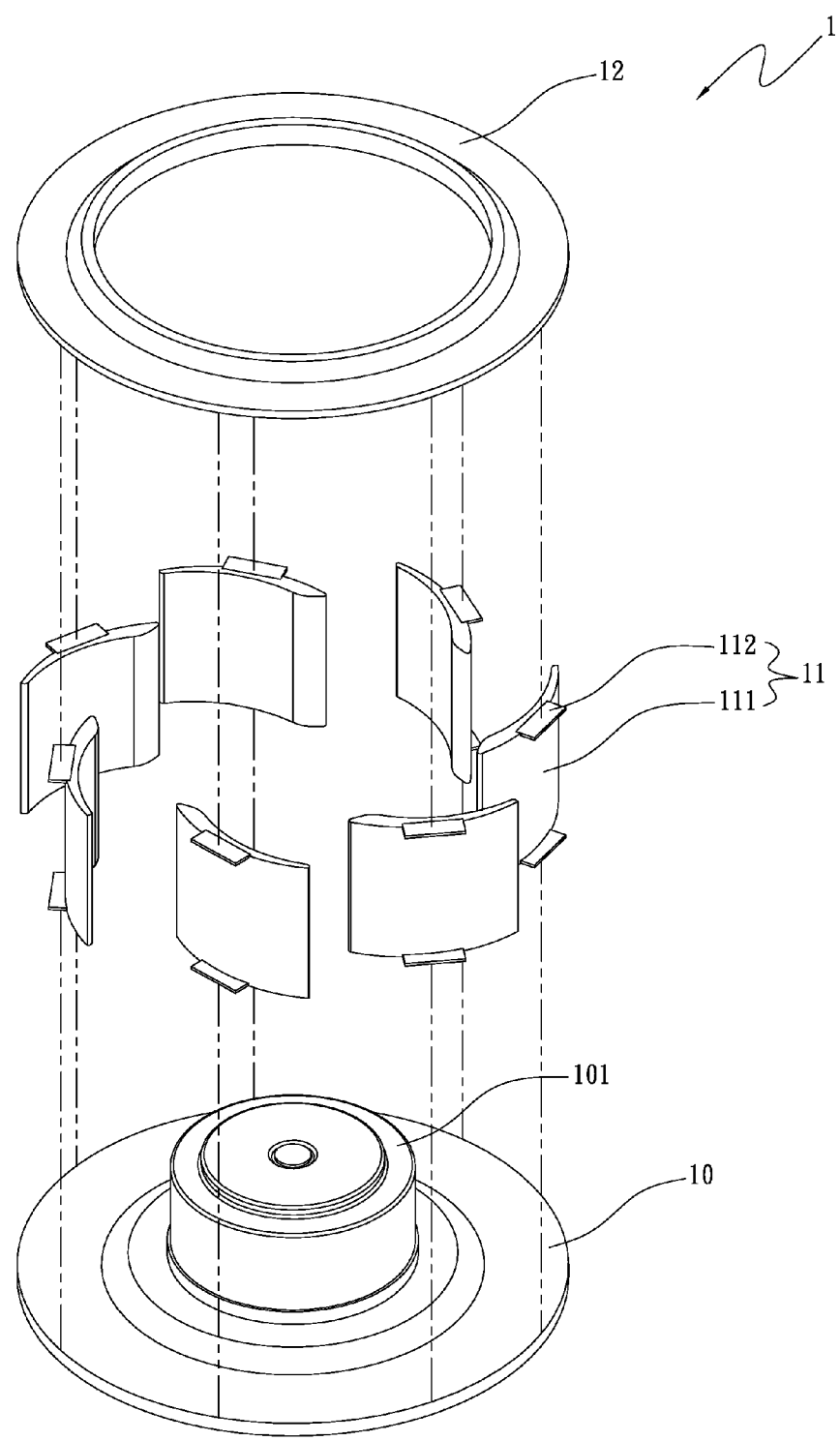
FIG. 1A is a perspective exploded view of a first embodiment of the fan impeller structure of the present invention.
Figure 1B:
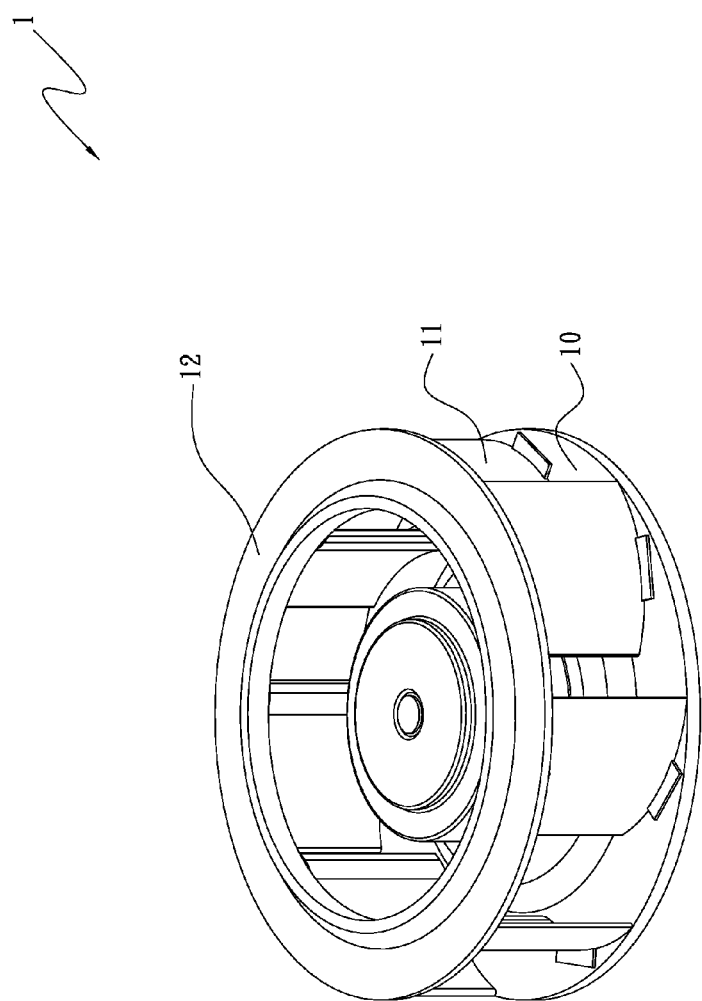
FIG. 1B is a perspective assembled view of the first embodiment of the fan impeller structure of the present invention.

Please refer to FIGS. 1A and 1B. FIG. 1A is a perspective exploded view of a first embodiment of the fan impeller structure of the present invention. FIG. 1B is a perspective assembled view of the first embodiment of the fan impeller structure of the present invention. According to the first embodiment, the fan impeller structure 1 of the present invention includes a base seat 10, multiple blades 11 and a ring member 12. The base seat 10 and the ring member 12 are made of metal material. A center of the base seat 10 is formed with a hub section 101. Each blade 11 has a main body 111 made of plastic material and at least one fixing member 112 made of metal material. The base seat 10 and the ring member 12 are respectively disposed on two sides of the blades 11.

The ring member 12 and the base seat 10 are made by means of sheet metal processing. After the fixing members 112 of the blade 11 are located, the main body 111 is molded by means of plastic injection molding. Then the base seat 10 and the ring member 12 are assembled with the blades 11 by means of welding or riveting. The blades 11 can be manufactured in various forms by means of plastic injection molding and then connected with the ring member 12 and the base seat 10 made by means of sheet metal processing. Accordingly, various combinations of fan impeller structures 1 can be easily achieved to diversify the blades 11 and increase the universality of the blades 11. In contrast, in the conventional manufacturing method, one set of molds can be only used to produce one kind of blades. Therefore, thanks to the present invention, the cost for the blades is greatly lowered.

Figure 2A:
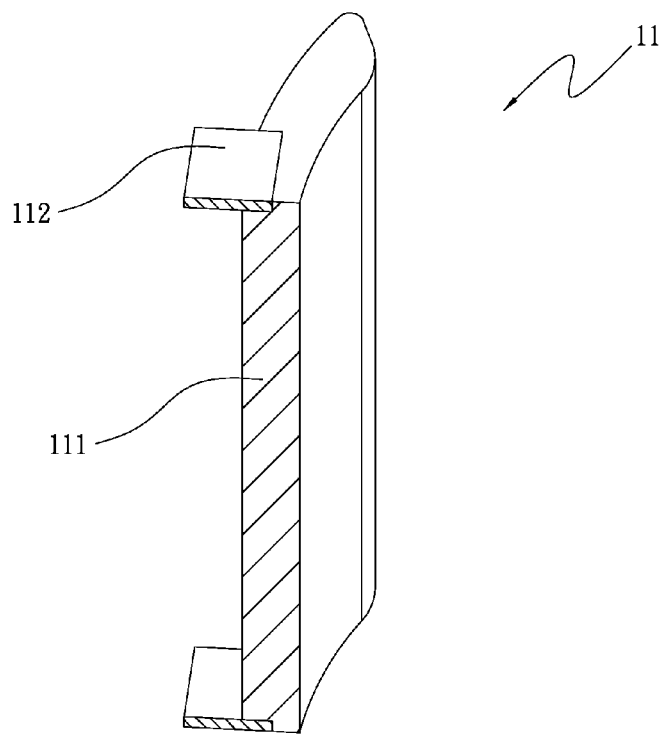
FIG. 2A is a perspective sectional view of the blade of the fan impeller structure of the present invention in one aspect.
Figure 2B:
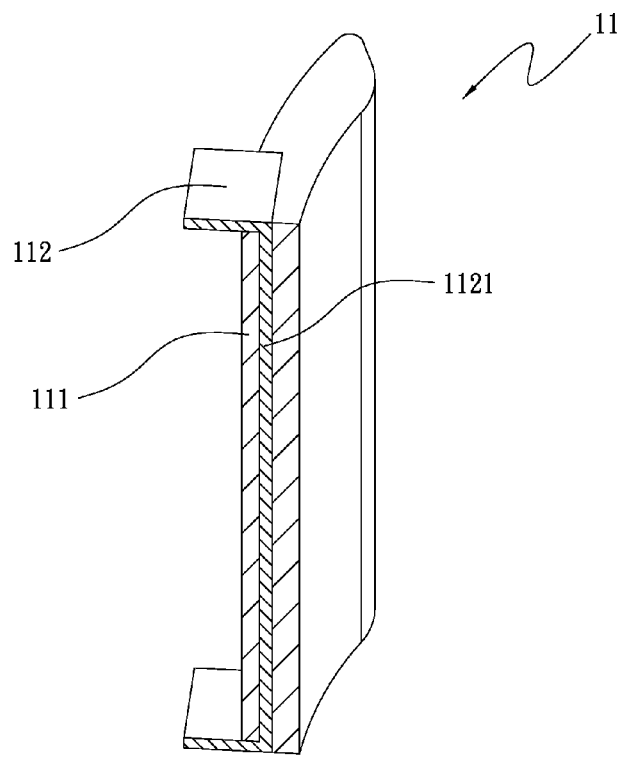
FIG. 2B is a perspective sectional view of the blade of the fan impeller structure of the present invention in another aspect.

Please now refer to FIGS. 2A and 2B. FIG. 2A is a perspective sectional view of the blade of the fan impeller structure of the present invention in one aspect. FIG. 2B is a perspective sectional view of the blade of the fan impeller structure of the present invention in another aspect. The fixing members 112 can be disposed on two end faces of the blade 11 (as shown in FIG. 2A). Alternatively, the fixing member 112 further has a locating section 1121 enclosed in the main body 111 (as shown in FIG. 2B). Both arrangements can achieve the objects of diversification and universality of the blades 11.

Figure 3:
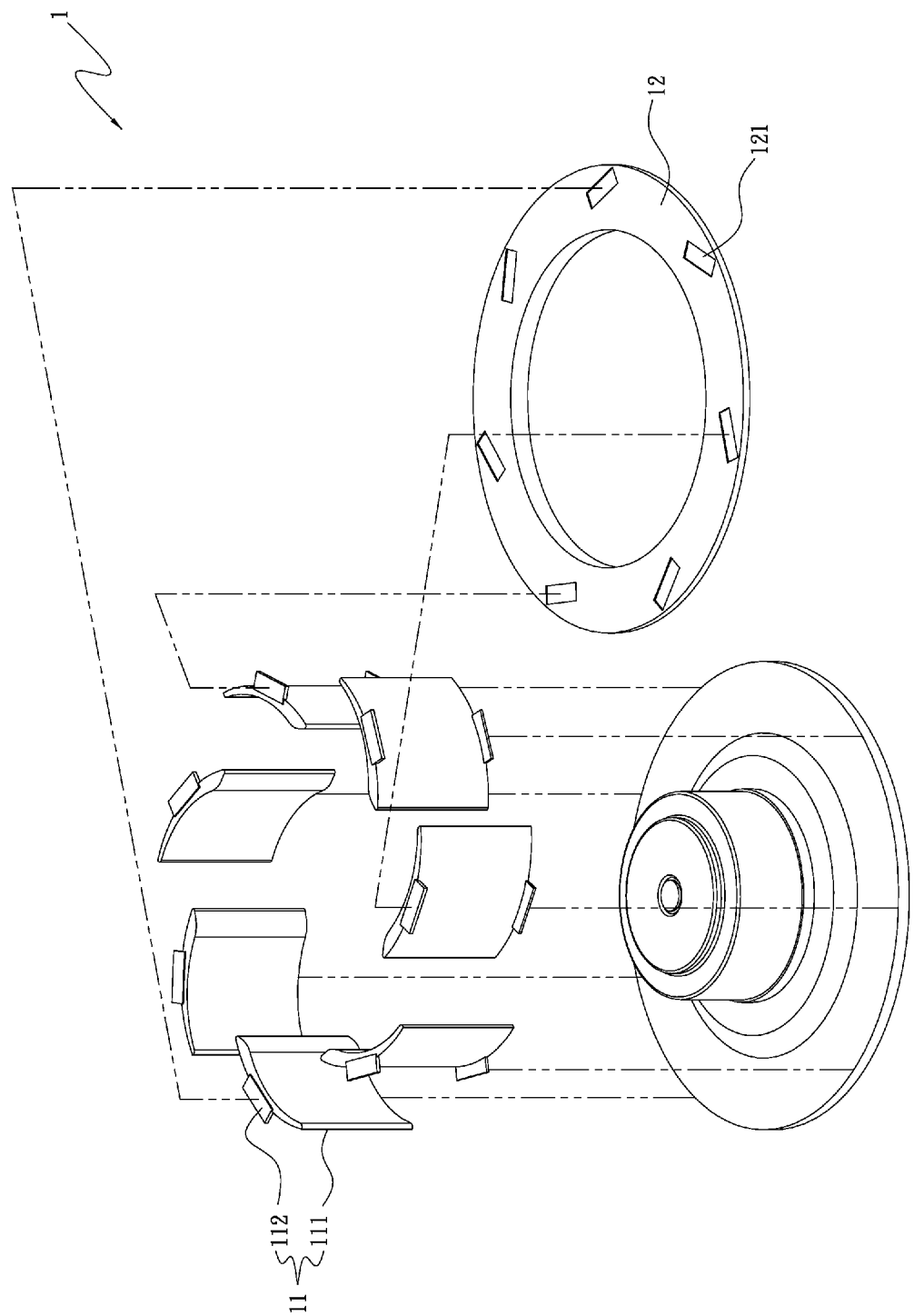
FIG. 3 is a perspective exploded view of a second embodiment of the fan impeller structure of the present invention.

Please now refer to FIG. 3, which is a perspective exploded view of a second embodiment of the fan impeller structure of the present invention. The second embodiment is partially identical to the first embodiment in structure and connection relationship and thus will not be repeatedly described hereinafter. The second embodiment is different from the first embodiment in that the ring member 12 further has multiple fixing slots 121 formed in positions where the fixing members 112 are fixed. When assembled, the fixing members 112 are correspondingly fixedly connected to the fixing slots 121 so as to more securely connect the ring member 12 with the blades 11.

Figure 4A:
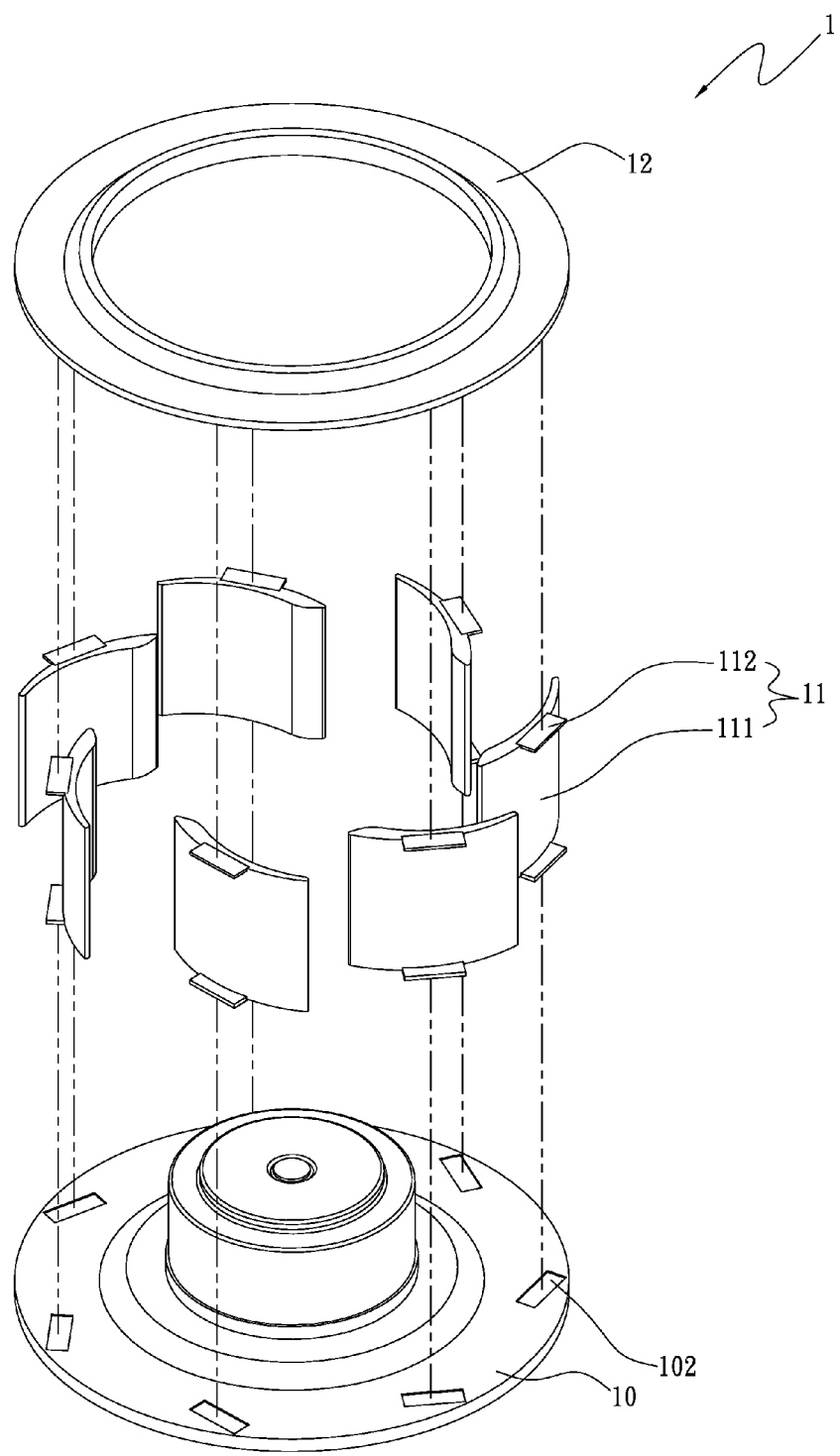
FIG. 4A is a perspective exploded view of a third embodiment of the fan impeller structure of the present invention.
Figure 4B:
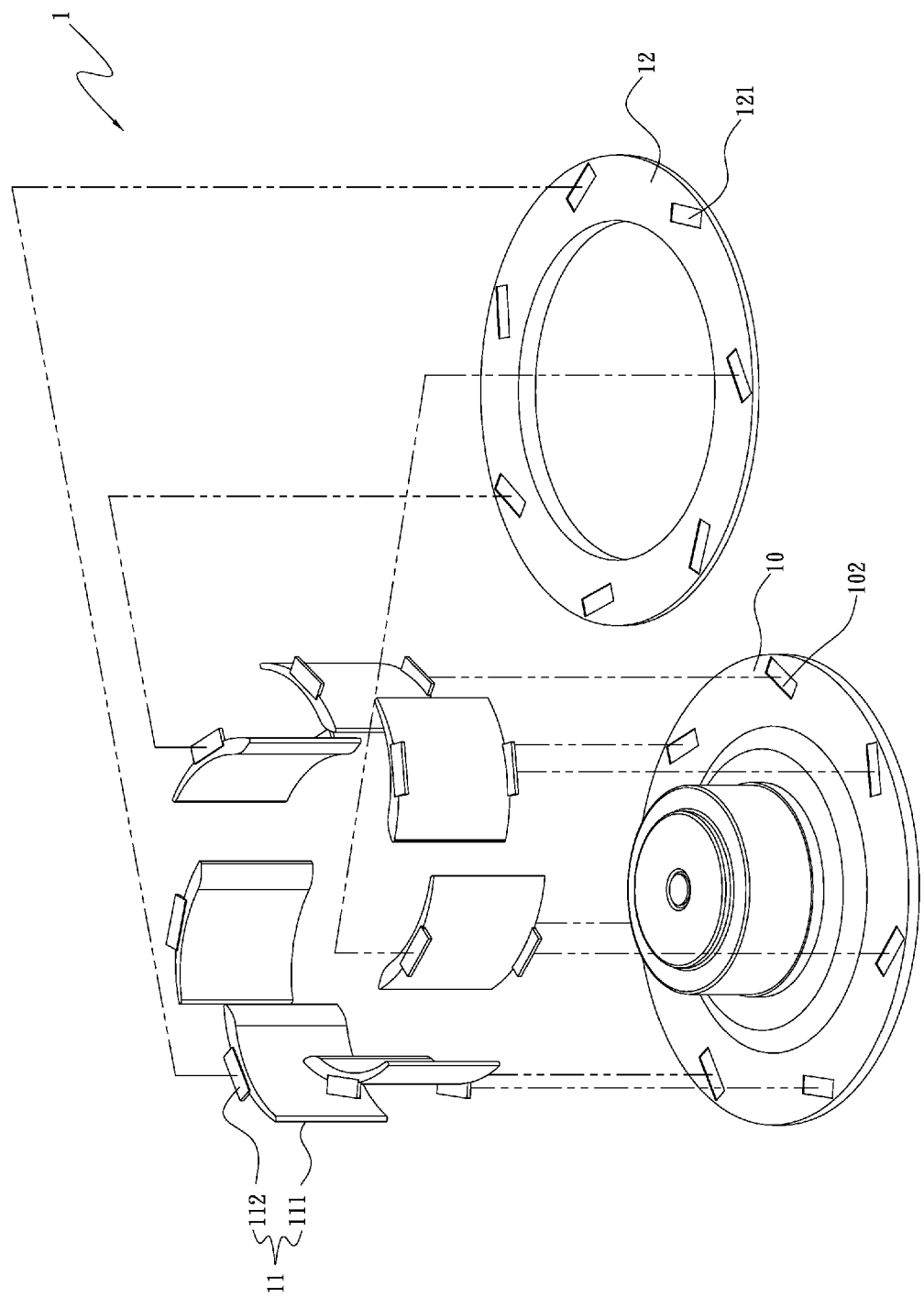
FIG. 4B is a perspective exploded view of a fourth embodiment of the fan impeller structure of the present invention.

Please now refer to FIGS. 4A and 4B. FIG. 4A is a perspective exploded view of a third embodiment of the fan impeller structure of the present invention. FIG. 4B is a perspective exploded view of a fourth embodiment of the fan impeller structure of the present invention. The third embodiment is different from the second embodiment in that the base seat 10 further has multiple locating slots 102 (as shown in FIG. 4A) formed in positions where the fixing members 112 are fixed. Alternatively, the ring member 12 has multiple fixing slots 121 and the base seat 10 also has multiple locating slots 102 (as shown in FIG. 4B). When assembled, the fixing members 112 are correspondingly fixedly connected to the fixing slots 121 and the locating slots 102 so as to more securely connect the ring member 12 and the base seat with the blades 11. In this case, the fan impeller structure 1 is more rigid.

Figure 5:
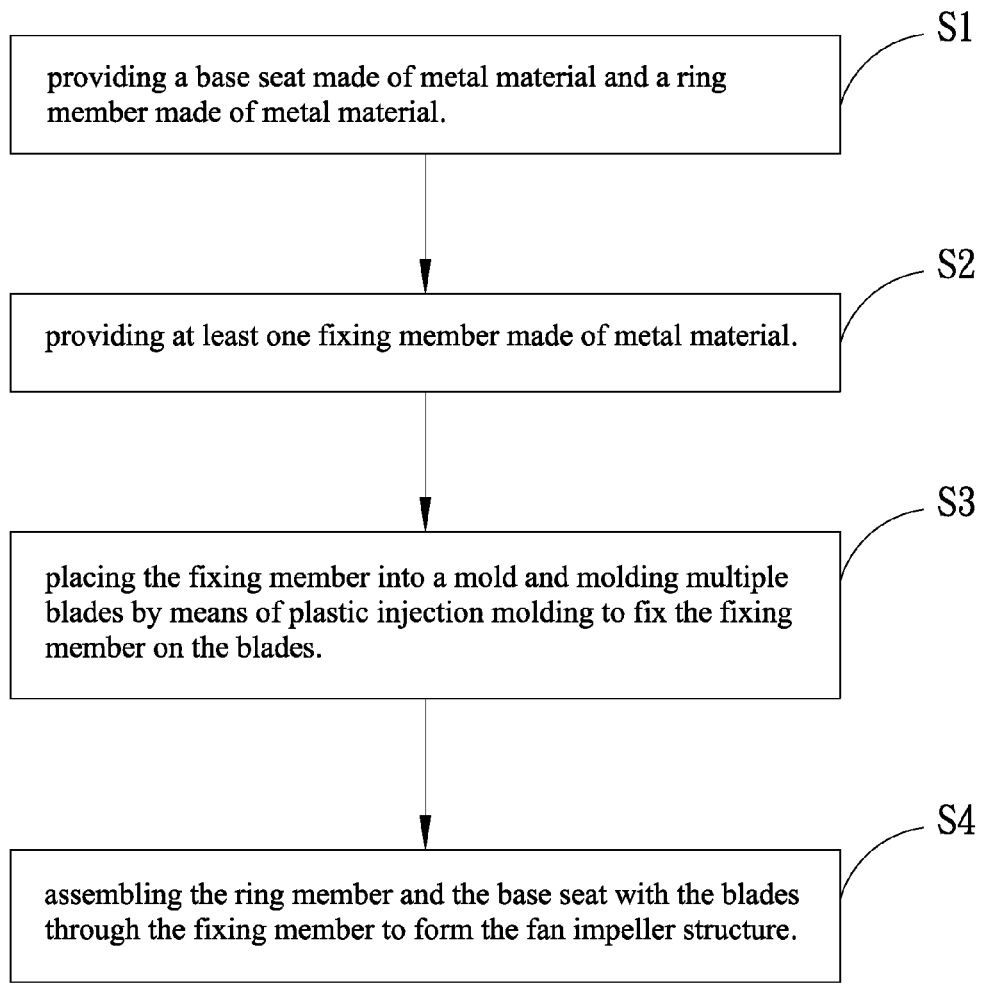
FIG. 5 is a flow chart of a first embodiment of the manufacturing method of the fan impeller of the present invention.

Please now refer to FIG. 5, which is a flow chart of a first embodiment of the manufacturing method of the fan impeller of the present invention. Also referring to FIG. 1A, the manufacturing method of the fan impeller of the present invention includes steps of:

S1: providing a base seat made of metal material and a ring member made of metal material, a base seat 10 made of metal material and a ring member 12 made of metal material being provided, the base seat 10 and the ring member 12 being made by means of sheet metal processing;

S2: providing at least one fixing member made of metal material, at least one fixing member 112 made of metal material being provided;

S3: placing the fixing member into a mold and molding multiple blades by means of plastic injection molding to fix the fixing member on the blades, the fixing member being placed into a mold and multiple blades 11 being molded by means of plastic injection molding to fixedly connect the fixing member 112 on the blades 11; and S4: assembling the ring member and the base seat with the blades through the fixing member to form the fan impeller structure, the ring member 12 and the base seat 10 being assembled with the blades 11 through the fixing member 112, the ring member 12 and the base seat 10 being connected with the fixing member 112 by means of welding or riveting to form the fan impeller structure 1.

In the above manufacturing method of the fan impeller, the blades 11 are made by means of plastic injection molding so that various fan impellers can be manufactured. The blades 11 can be connected with the ring member 12 and the base seat 10, which are made by means of sheet metal processing. Accordingly, various combinations of fan impeller structures 1 can be easily achieved to diversify the blades 11 and increase the universality of the blades 11 so as to greatly lower the cost.

In conclusion, in comparison with the conventional technique, the present invention has the following advantages:
1. The design of the blades is more diversified.
2. The manufacturing cost is greatly lowered.

The above embodiments are only used to illustrate the present invention, not intended to limit the scope thereof. It is understood that many changes and modifications of the above embodiments can be made without departing from the spirit of the present invention. The scope of the present invention is limited only by the appended claims.

What is claimed is:

1. A fan impeller structure comprising:
   a base seat made of metal material and having multiple locating slots at one side, a center of the base seat being formed with a hub section;
   multiple blades disposed on one side of the base seat, each blade having a main body made of plastic material and at least one fixing member made of metal material, the at least one fixing member being fixed in the corresponding locating slots and further disposed on and attached to two end faces of the main body, and not protruding from the two end faces of the main body; and
   a ring member made of metal material and disposed on the other side of the blades;
   the ring member further having multiple fixed slots formed in position where the fixing members are fixed; wherein the fixing members are attached to the multiple locating slots and the fixing slots.

2. The fan impeller structure as claimed in claim 1, wherein the ring member and the base seat are made by means of sheet metal processing.

3. The fan impeller structure as claimed in claim 1, wherein the blades are molded by means of plastic injection molding.

4. The fan impeller structure as claimed in claim 1, wherein the fixing member further has a locating section enclosed in the main body.

5. A manufacturing method of a fan impeller, comprising steps of:
   providing a base seat made of metal material and a ring member made of metal material;
   providing at least one fixing member made of metal material;
   placing the fixing member into a mold and molding multiple blades by means of plastic injection molding to fix the fixing member on the blades, wherein the at least one fixing member is disposed and attached to two end faces of the main body, and not protruding from the two end faces of the main body.

6. The manufacturing method of the fan impeller as claimed in claim 5, wherein the ring member and the base seat are connected with the fixing member by means of welding or riveting.

7. The manufacturing method of the fan impeller as claimed in claim 5, wherein the ring member and the base seat are made by means of sheet metal processing.

8. The manufacturing method of the fan impeller as claimed in claim 5, wherein the fixing member further has a locating section enclosed in the main body.

* * * * *